(12) United States Patent
Gallone et al.

(10) Patent No.: US 9,041,597 B2
(45) Date of Patent: May 26, 2015

(54) METHOD FOR FILTERING OF CLUTTER BY SCAN-TO-SCAN CORRELATION USING DOPPLER INFORMATION

(71) Applicant: SELEX SISTEMI INTEGRATI S.P.A., Rome (IT)

(72) Inventors: Sergio Gallone, Rome (IT); Felicia Amato, Rome (IT); Antonio Brelati, Rome (IT); Antonio Stile, Rome (IT); Giovanni Golino, Rome (IT)

(73) Assignee: SELEX SISTEMI INTEGRATI S.P.A., Rome (IT)

( * ) Notice: Subject to any disclaimer, the term of this patent is extended or adjusted under 35 U.S.C. 154(b) by 276 days.

(21) Appl. No.: 13/730,606

(22) Filed: Dec. 28, 2012

(65) Prior Publication Data

US 2013/0169473 A1  Jul. 4, 2013

(30) Foreign Application Priority Data

Dec. 28, 2011  (IT) .............................. RM2011A0689

(51) Int. Cl.
*G01S 7/35*  (2006.01)
*G01S 7/288*  (2006.01)
*G01S 7/292*  (2006.01)
*G01S 7/41*  (2006.01)

(52) U.S. Cl.
CPC ............... *G01S 7/354* (2013.01); *G01S 7/288* (2013.01); *G01S 7/2923* (2013.01); *G01S 7/414* (2013.01)

(58) Field of Classification Search
CPC ....... G10S 7/288; G10S 7/2923; G10S 7/354; G10S 7/414
USPC ........................................................... 342/159
See application file for complete search history.

(56) References Cited

U.S. PATENT DOCUMENTS

| | | | |
|---|---|---|---|
| 3,699,573 A | 10/1972 | Andrews et al. | |
| 4,972,194 A | 11/1990 | Carrara et al. | |
| 5,097,268 A * | 3/1992 | Bauer et al. | .................. 342/160 |
| 2010/0026559 A1 | 2/2010 | Siegel | |

OTHER PUBLICATIONS

J. P. Hansen and V. F. Cavaleri, "High-Resolution Radar Sea Scatter, Experimental Observations and Discriminants," NRL Report 8557, Mar. 5, 1982.
Non-Final Office Action issued on Dec. 9, 2014 for U.S. Appl. No. 13/730,610 filed on Dec. 28, 2012 in the name of Sergio Gallone.

* cited by examiner

*Primary Examiner* — Timothy A Brainard
(74) *Attorney, Agent, or Firm* — Steinfl & Bruno LLP

(57) ABSTRACT

The present disclosure concerns a method for post-processing of radar data that uses information of Doppler speed as obtained by coherent processing of the input data, to reduce clutter due to waterbodies, in particular the sea clutter. The present disclosure further concerns a coherent radar provided with means suitable to implement the invention method.

10 Claims, 6 Drawing Sheets

(a)　　　(b)

METHOD FOR FILTERING OF CLUTTER BY SCAN-TO-SCAN CORRELATION USING DOPPLER INFORMATION

CROSS REFERENCE TO RELATED APPLICATIONS

The present disclosure concerns a method for filtering of clutter by scan-to-scan correlation using Doppler information and claims priority to Italian patent application number RM2011A000689, filed on Dec. 28, 2011, which is incorporated herein by reference in its entirety.

The present application is also related to U.S. application Ser. No. 13/730,610 entitled "Method for Determining an Estimate of Radial Speed of Radar Echoes by Using Doppler Information" and filed on even date herewith, which is also incorporated herein by reference in its entirety.

More in detail, the present disclosure concerns a method of post-processing of the radar data that uses the information of the absolute Doppler speed as obtained by the coherent elaboration of the input data.

FIELD

With the term clutter, one indicates all the undesired echoes received by a radar, usually constituted by the reflection of the electro-magnetic energy upon natural elements (mountains, precipitations, etc.) or artificial (buildings, architectural structures, etc.) of the ambient surrounding the target. Therefore, the clutter constitutes a disturbance of the additive type (besides the thermal noise and the jamming) that superposes to the useful signal identifying instead the target to be detected.

The problem of filtering the clutter in the marine field is well known in literature: when one uses a radar in the X band with medium or high range resolution (i.e. 5-10 meters), the sea clutter shows itself in the form of a multitude of temporary peaks or "spikes" of the sea surface visualized on the console of the operator. This clutter depends on the sea state and the grazing angle of the radar. This phenomenon has as an effect of producing radar echoes that have the same behaviors as small targets. The occurrence rate of this effect show an increment as soon as the sea roughness state increases, and such an effect produces in the detection a white background that cannot be filtered by the usual tracking processing.

In particular, concerning the spikes one has the following [1,2]:
  The radar echoes coming from marine ambient, as seen by a high resolution radar, are of short duration and repetitive and are termed "sea spikes";
  The typical duration of the sea spikes, for a X band radar is around 1 second, and with a repetition time of around 12-16 s, for sea states below force 3;
  When the sea is seen by a high resolution radar, many sea spikes are detected that any other signal is concealed. With low resolution radar the sea spikes appears continuous and random.

In FIG. 1, the time progression of an echo relevant to a true target is shown (a signaling buoy), as obtained by a conventional Doppler filtering of the radar signal.

In FIG. 2, the progression of a sea spike is represented: it comes out to be equivalent to that of the target of FIG. 1. This shows that it is not possible to distinguish one from the other, and therefore it is not possible to filter them, by exploiting only the amplitude characteristics along time.

Patent document U.S. Pat. No. 3,699,573 A [3] describes a canonical method for the correlation of plots on subsequent scans or "scan to scan correlator", wherein a hypothetical maximum speed is used which can be reached by targets of interest, which is fixed "a priori" and which cannot solve in an effective way the problem of the sea spikes, since the correlation windows generated in such a way are too large and the probability to have sea spikes in the so determined windows in both scans is such not to be able to filter in a decisive way the sea spikes.

Patent document US 2010/026559 A1 [4] describes a method to discriminate between target and clutter to improve "a priori" the detection performances of the target. For all the range cells, even if they do not generate plots, the method tries to eliminate the clutter without necessarily using a coherent radar: one has to resort to the estimation of the relative speed between target and clutter that is obtained by the phase difference of the radar signal along the range in the absence of a univocal phase reference between transmitter and receiver. The method described, that is applied entirely in the signal processing, presents however unsatisfactory results in the case of sea spikes.

Patent document U.S. Pat. No. 4,972,194 A [5] describes a method of the estimation of the Doppler speed by the calculation of the phase difference between echoes of a burst of subsequent transmitted impulses to the end of determining the average Doppler speed of the clutter to per calibrate a Doppler filter that carries out the cancellation of such a clutter in the radar signal of the subsequent burst, obtaining results that are still unsatisfactory in the case of sea spikes. This method is applied entirely in the signal processing as well.

SUMMARY

These known methods are not enough effective in the filtering of the sea spikes. There is a need for a method that, by processing the radar information in a different way, succeeds to obtain a better final filtering, i.e. to discriminate the detections of the various naval vessels from those of the sea spikes.

According to an aspect of the present disclosure, a method for filtering the clutter that solves the problems connected to the sea spikes and overcomes the inconveniences of the prior art is provided.

In particular, according to an aspect of the present disclosure, a method is provided for filtering clutter caused by waterbodies, in particular seas, rivers, lakes, by means of scan-to-scan correlation of the radar information, utilizing a radar covering a radar area in subsequent scans of duration $T_{scan}$ wherein the radar transmits a signal and listens to return echoes during a sweep time interval, the radar comprising i) a coherent transmitter and receiver with a coherent oscillator that gives the phase reference, ii) a signal processor, and iii) a radar extractor that on the basis of detected echoes produced either by objects close to a waterbody surface or by the waterbody surface itself, extracts plots characterized by range and azimuth, the method separating plots relating to objects from the plots relating to waterbody by performing the following steps:

A. estimating a radial speed of the plots, and
B. scan-to-scan correlating the plots;
wherein step A comprises i) quantization of the radar area into a plurality of elementary radar cells, in particular having dimensions comparable to a range radar resolution, and ii) execution of the following sub-steps:
A1. extracting from the radar signal provided by the coherent receiver a phase of all echoes within a single sweep, A2. for each radar cell, calculating phase differences $\Delta\phi$ between any two subsequent sweeps within a predefined coherent processing interval (CPI) comprising a multiplicity of subsequent sweeps;

A3. for the radar cells wherein the radar extractor has extracted a plot, calculating instantaneous absolute radial speeds v and radial direction of the echoes, starting from the phase differences of sub-step A2, as $v=(\lambda/4\pi T)\cdot\Delta\phi$, wherein the radial direction of the echoes is positive in case of moving away of the object that has caused the echo from the radar and negative in the case of approaching to the radar, $\lambda$ is a radar operation wavelength, T is a time interval between two subsequent steps;

A4. averaging the values of the absolute radial speeds and directions of the echoes obtained in sub-step A3, obtaining the radial speeds and radial directions of the corresponding extracted plots;

wherein step B comprises the following sub-steps executed by the radar extractor for each extracted plot, using a memory area:

B1. storing the plot with range R and azimuth A in said memory area at each radar scan;

B2. defining a range-azimuth area, having:
  half angular azimuth width $LA_a = a\sin(V_{max} T_{scan}/R)$, wherein $V_{max}$ is a pre-defined maximum absolute speed for the target at the range R of the plot;
  half range width $LR_a \cong 3\cdot\sqrt{\sigma_R^2+\sigma_v^2\cdot T_{scan}^2}$, wherein $\sigma_R^2$ is a variance of a range estimation error and $\sigma_v^2$ is a variance of the Doppler speed estimation error;
  range center position $R_b = R - v^* T_{scan}$, using said absolute radial speeds v of the plot calculated in step A4;
  azimuth center position $A_b = A$.

B3. correlating by position the plot of the current radar scan with all plots stored in said memory area during a previous scan, in order to verify whether at least one of the stored plots falls within said range-azimuth area;

B4. if the correlation value obtained in step B3 is below a pre-defined threshold, so that the whole plot falls outside said range-azimuth area, eliminating the plot from said memory area;

wherein the remaining plot in said memory area are being put at disposal to the radar for a further analysis and visualization on a radar display.

Sub-steps A3 and A4 for the calculation of the Doppler absolute speed are performed downstream of the radar extractor and not in the signal processing (as for example in [4] and [5]), thus decreasing the computational load with respect to this type of solutions.

The average of step A4 can be the arithmetic average of a weighted average (for example by the values of the amplitudes), and can therefore coincide in a particular case with the maximum value of the series (all the weights vanish except that of the maximum).

The radial speed calculated by the method is absolute because the utilized radar system can be coherent, differently from other techniques (as for example that of [4]) wherein the phase coherence is not required and instead the relative difference between the target speed and the clutter speed is utilized.

It can be $LR_a \approx 3\cdot\sqrt{\sigma_R^2+\sigma_v^2\cdot T_{scan}^2}$ or $LR_a = 3\cdot\sqrt{\sigma_R^2+\sigma_v^2\cdot T_{scan}^2}$ and this approximation holds also for any other relationship of step B.

According to an aspect of the present disclosure, the scan-to-scan correlation of step B3 is further performed with respect to plot speeds.

According to an aspect of the present disclosure, the radar is a radar with a solid-state radar transmitter for a monitoring of waterbodies and Vessel Traffic Service (VTS) applications.

According to an aspect of the present disclosure, a calculation of the instantaneous absolute radial speeds and radial directions is performed for each of the radar cells or for those radar cells that have generated detection in the signal processor, or have generated a plot in the radar extractor.

According to an aspect of the present disclosure, the correlation of step B3 is performed with respect to plots of $k \geq 2$ previous scans, where k is a positive integer.

According to an aspect of the present invention, said elementary radar cells have dimensions comprised between 0.5 times and 2 times the radar range resolution.

According to another aspect of the present disclosure a coherent radar is provided, in particular for the detection of objects on waterbodies, that covers a certain radar area in subsequent scans of duration $T_{scan}$ wherein the coherent radar transmits a signal and listens to return echoes during a sweep time interval and has a coherent transmitter and a coherent receiver, a signal processor, a radar extractor that extracts plots characterized by range and azimuth, and electronic processing means configured to execute the steps of the clutter filtering according to the invention.

According to an aspect of the present disclosure, the radar comprises a console that includes a display for a visualization of radar detections, wherein a signal filtered by said electronic processing means is visualized.

According to an aspect of the present disclosure, said electronic processing means are constituted by the signal processor.

BRIEF DESCRIPTION OF DRAWINGS

The subject-matter of the present disclosure will be now described by way of illustration but not by way of limitation, with particular reference to the figures of the annexed drawings, wherein.

DETAILED DESCRIPTION

The method according to the present disclosure for the filtering of the sea clutter can be separated in two parts:
  estimation of radial speed (of the echoes, be them targets or spikes), and scan-to-scan correlation by using the radial speed estimation, for the filtering of the sea clutter.

These two functions according to the present disclosure are according to one aspect to be applied in coherent radars with solid state transmitter for the sea monitoring and the Vessel Traffic Service (VTS) applications.

The present disclosure is useful for reducing the effects of the sea spikes and filtering the radar echoes without negatively influencing the correct target detection.

The estimation of the radial speed is based on the coherence of the radar (that for VTS applications can be obtained by nowadays technology of the radars with solid-state transmitter), and is subdivided into the following functions:

Subdividing the radar area into discrete range intervals defining the so-called radar cells;

Phase difference: estimation of the phase relevant to each radar cell in the single "sweep" (that is a time interval during which the radar listens to the return echoes) and calculates the phase difference for each radar cell between two subsequent sweeps, within a Coherent Processing Interval (CPI) comprising two or more subsequent sweeps;

For each radar cell, calculating the radial speed of the echoes starting from the phase difference between subsequent sweeps, as follows:

$$v = \frac{\lambda}{4\pi T}\Delta\varphi$$

wherein:
v=absolute and instantaneous radial speed, estimated from the radar echo
λ=wavelength
T=time interval between 2 subsequent sweeps
Δφ=phase difference of the radar signal between 2 subsequent sweeps For each radar cell, averaging the values of radial speed for all the echoes obtained within the CPI.

In order to limit the processing load without influencing the performances, it is possible to carry out, for each radar cell, only the calculation of the phase difference, whilst the calculation of the radial speed and its average can be performed only for the radar cells that have generated a plot after the extractor.

The conventional method for the estimation of the radial speed based on Doppler filters according to the prior art is not effective when sea spikes are present, because the speed of the targets to be detected can be very close to those of the sea spikes, i.e. greatly much smaller than the resolution permitted by the Doppler filter.

Figure 1:
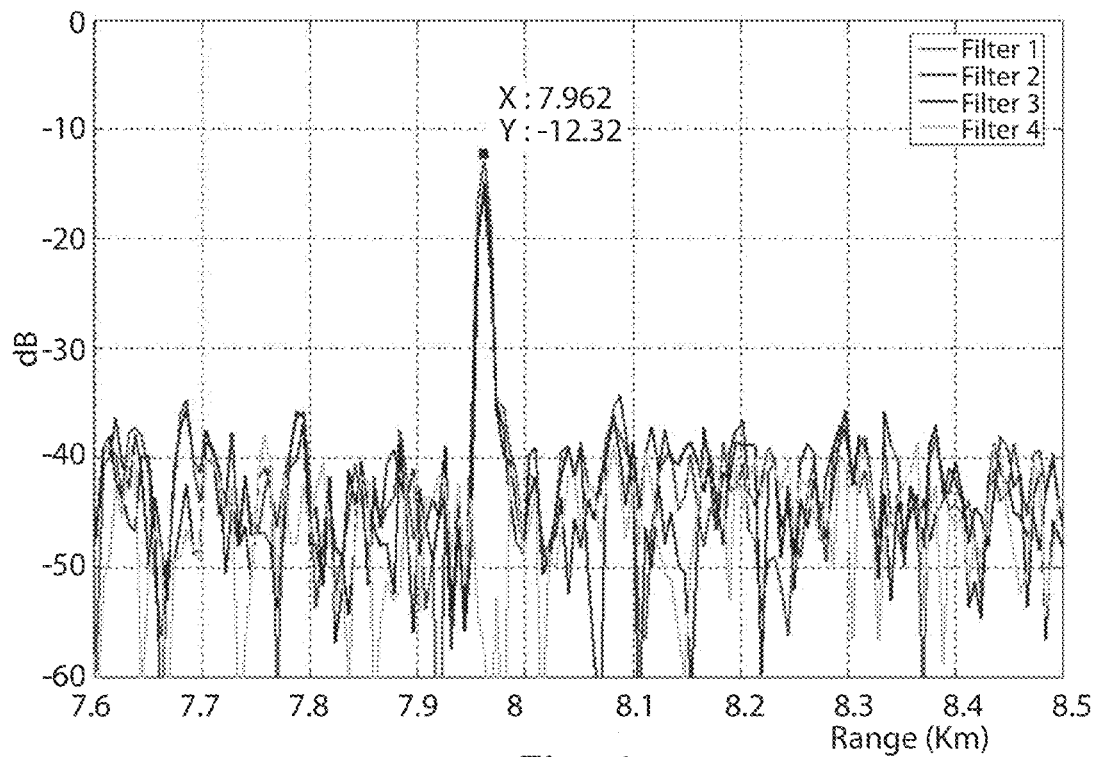
FIG. 1 shows the radar signal coming from a buoy at 7.96 km from the same radar, according to the known art.
Figure 2:
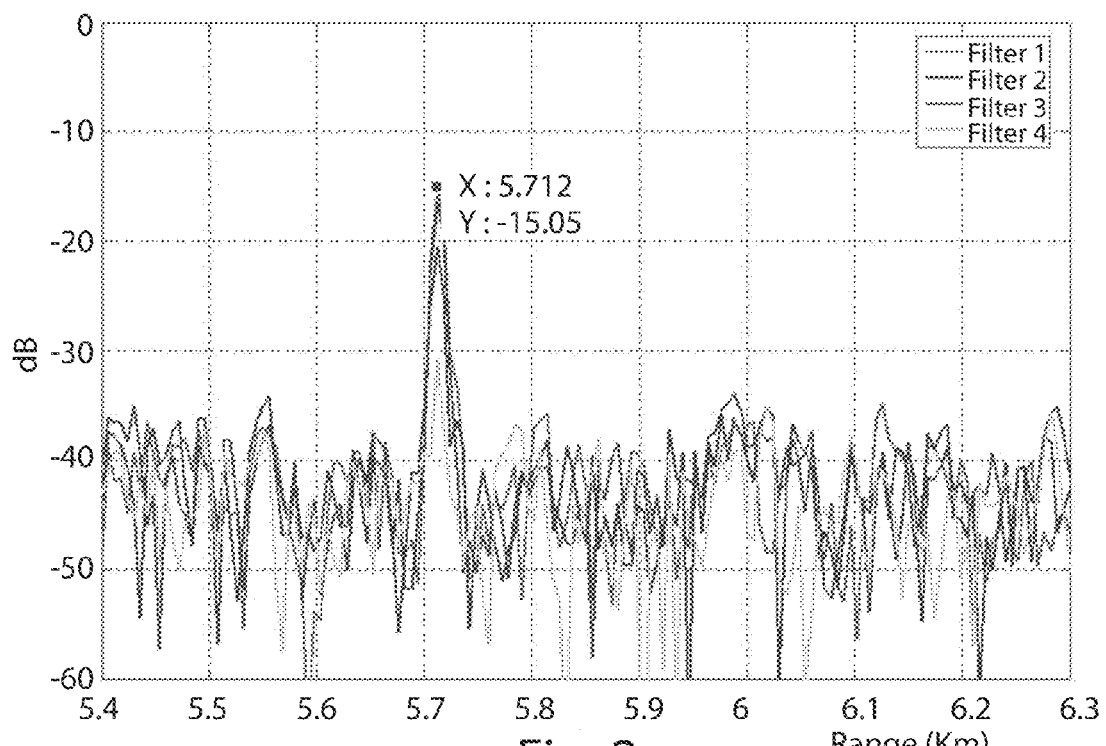
FIG. 2 is the radar signal coming from a sea spike at 5.72 km from the radar, according to the known art.
Figure 3:
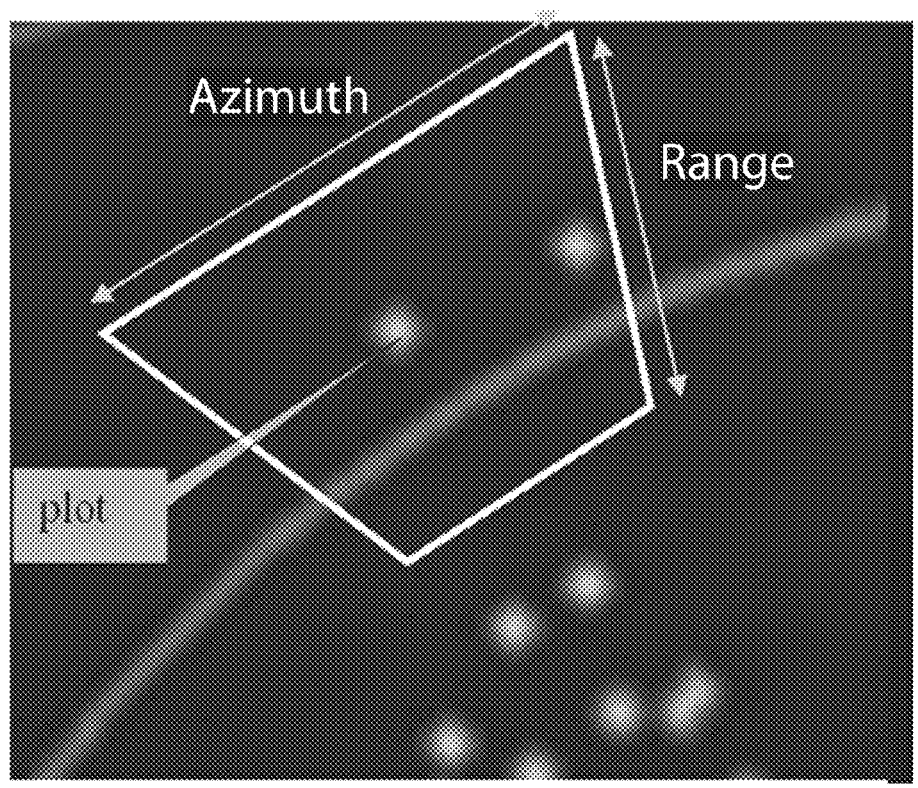
FIG. 3 is an example of range-azimuth window.
Figure 8:
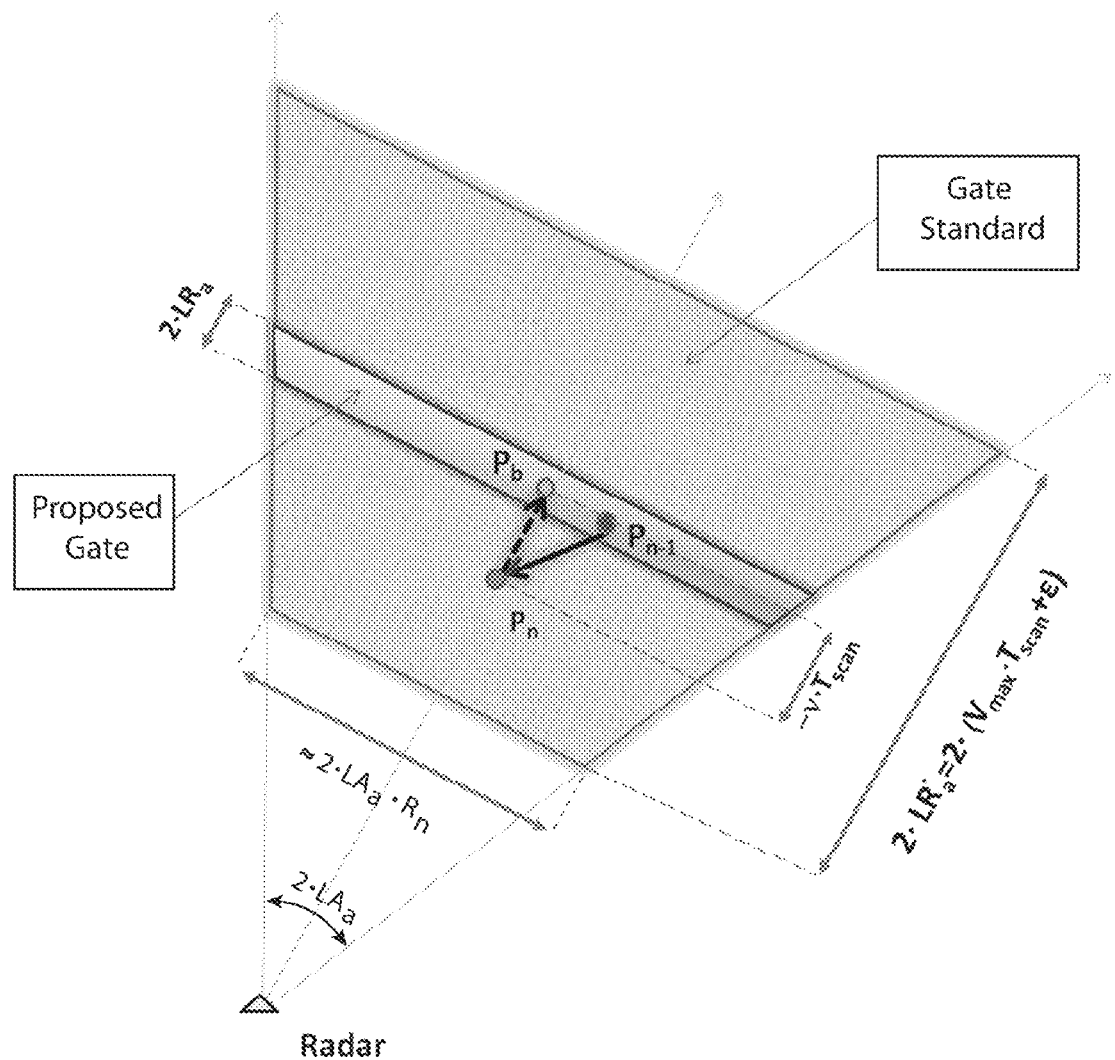
FIG. 8 shows graphically the difference in terms of range amplitude between the correlation window obtained by the present disclosure and that obtained by the canonical method of [3].

The other function, i.e. the scan-to-scan correlation with the use of the radial speed, is carried out at the level of the plots extraction (after the radar extractor), as follows:

Each extracted plot is stored in memory at each scan;
For each extracted plot, a range-azimuth area is considered, which is termed "window", as indicated in FIG. 3 and FIG. 8. The window is calculated as follows:

The azimuth angular half-amplitude of the window is calculated starting from the maximum speed that a target can reach for a specific state of the sea:

$$LA_a = a\sin\left(\frac{V_{max} \cdot T_{scan}}{R}\right)$$

wherein $LA_a$ is the azimuth angular semi-amplitude, $V_{max}$ is the target maximum speed, $T_{scan}$ is the scanning time interval of the radar antenna, and R is the range of the plot;

range angular semi-amplitude of the window is according to one aspect larger or equal to the maximum range system error of the radar (a smaller value could lead to losing the target because it would easily fall outside the window);

The radial position $R_b$ of the window center is calculated by subtracting, to the radial position of the plot, the range shift as derived from the radial speed and the scanning speed of the radar, as follows:

$$R_b = R - v \cdot T_{scan}$$

wherein R is the range position of the plot and v is the radial speed, that is positive in case of moving away of the target from the radar and negative in case of approaching to the same (the speed is used to make the windows sufficiently small to be able to carry out subsequently an effective correlation; otherwise, with large windows, the clutter would correlate as well);

The azimuth position $A_b$ of the window is the same position of the plot.

The window is used to correlate (in position, and, for a even deeper filtering, also in speed) the plot of the current radar scan with all the plots stored in the previous scan: if there is correlation with at least a plot of the previous scan, then the plot is stored for further processing required by the radar system, otherwise the plot is canceled.

On the basis of the tests performed by the Inventors, the estimation of the radial speed is necessary to obtain the results of the filtering method of the present disclosure, owing to the fact that, in the absence of such a data, the windows come out to be too large in range and the likelihood that at the previous scan another spike is present is very high, and therefore the filter is ineffective in these conditions.

On the basis of the radar type and the radar site, the following parameters are for example defined in the method according to the present disclosure:

Azimut amplitude of the windows: as a function of range and maximum target speed;
Maximum error for the evaluation of speed, that is useful in the case of speed correlation;
Number of stored scans: the algorithm can be extended to process (by the above correlation) the stored plot of the previous scan or of k≥2 previous scans, to obtain a better filtering;
Maximum range: the maximum range wherein the clutter is expected.

The functionality permitted by the method of the present disclosure has been tested on a solid-state coherent radar (the coherence is in any case essential to detect the absolute phase and estimate the absolute radial speed), in different sites and conditions of the sea with the following parameters:
Maximum speed for the target: 10 Knots,
Maximum Range for the clutter: 10 Km,
Maximum Error for the speed evaluation: 1 m/s.

The application of the method according to the present disclosure has produced the following results:
Probability of detecting the target: the reduction of the detection probability with the above parameters was negligible;

Probability of false alarms: the number of false alarms produced by the spikes, with the above parameters, diminished by an order of magnitude, with force ≥3 sea state conditions.

Figure 4:
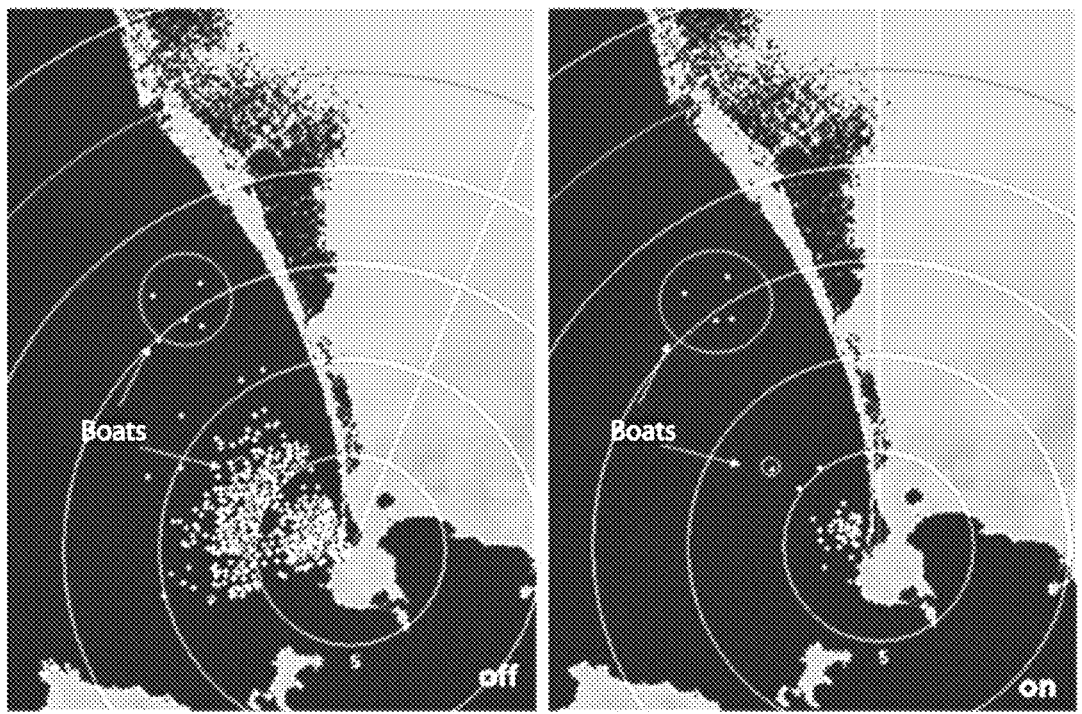
FIG. 4 is an image of the radar display without (a) and with (b) the filter according to the present disclosure, as obtained during an experimental proof in force 3 sea conditions.

In FIG. 4, the result obtained in conditions of raging wind is shown (sea state beyond force 3), without (a) and with (b) the application of the filter according to the present disclosure.

As above evidenced, the nowadays methods do not allow an effective filtering of the spikes, because for the sea applications non-coherent magnetron radar are utilized.

The non-coherent radars do not allow the estimation of the absolute radial speed, essential to obtain an effective filtering according to the method described by the present disclosure. The described method overcomes the limitations by utilizing a coherent solid-state radar of last generation, but it is obviously applicable to any future technology providing the coherence.

Figure 5:
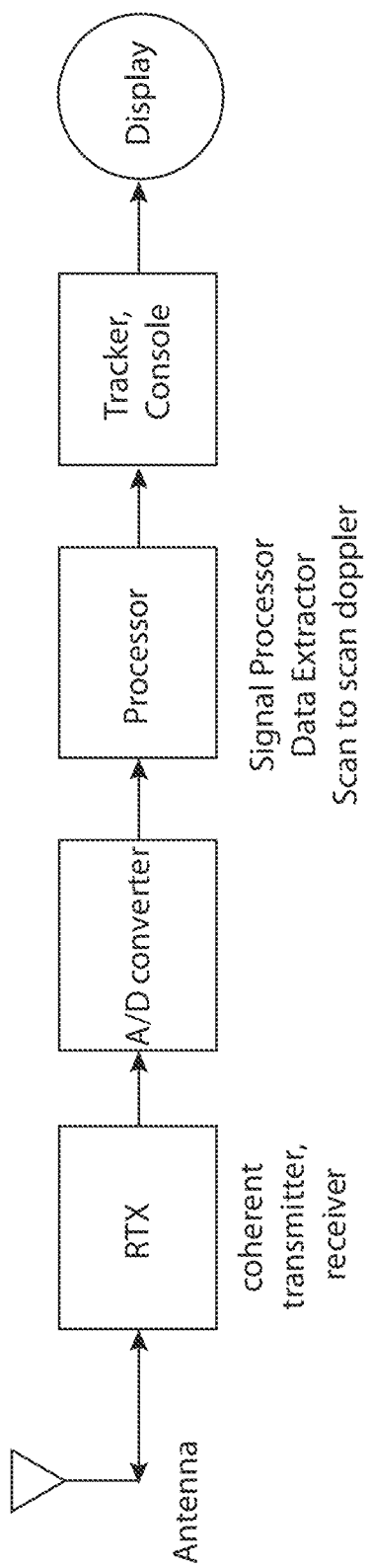
FIG. 5 shows a block and flow-chart diagram of a radar implementing the method according to the present disclosure.
Figure 6:
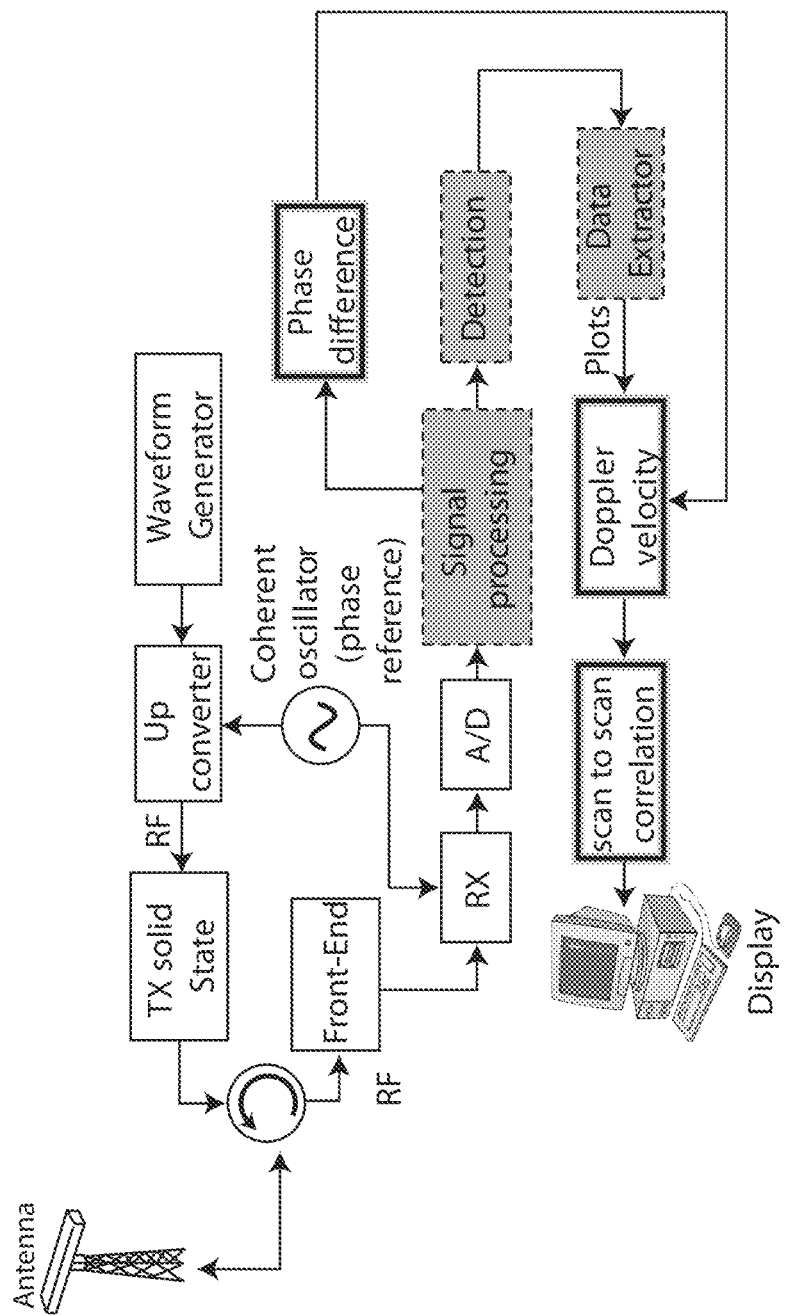
FIG. 6 shows a block diagram of the radar, that is more detailed than that of FIG. 5, wherein the phase coherence between transmitter and receiver is highlighted.
Figure 7:
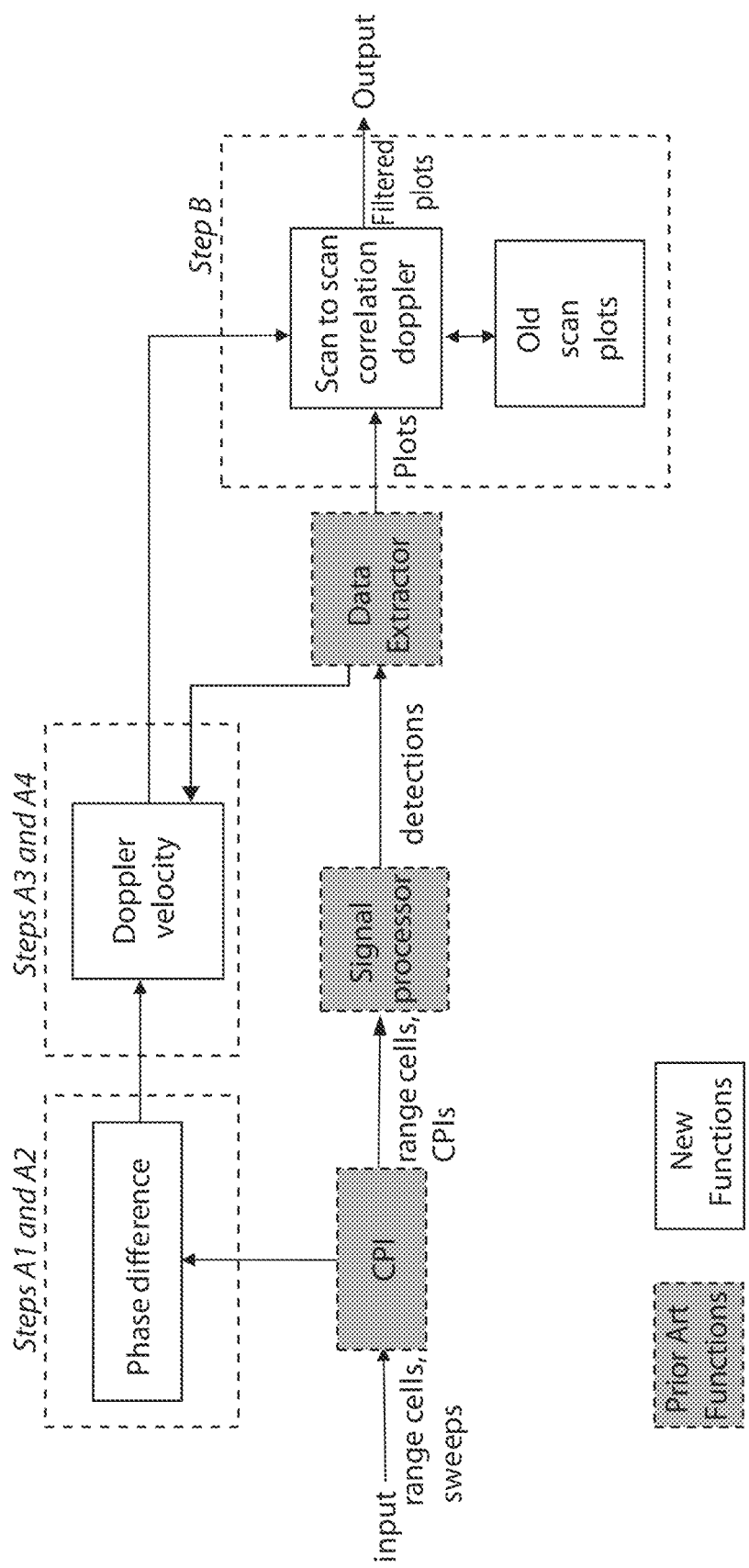
FIG. 7 shows a block diagram of the overall method according to the present disclosure: the darker blocks represent the standard functions, the other ones the functions added thanks to the present disclosure.

FIG. 6 shows a block diagram of an exemplary radar that is more detailed than that of FIG. 5. In FIG. 6, the following is indicated:

A Waveform generator that generates a low-frequency version of the signal to be transmitted;

A coherent oscillator that guarantees the phase coherence between the transmitter and the receiver, i.e. the phase reference necessary to determine the absolute Doppler frequency of the echoes;

An up-converter that transform the signal generated at low frequency into a radio-frequency (RF) signal for the transmission;

A solid-state transmitter TX that guarantees the required power;

A circulator connected to the antenna to decouple the transmitter from the receiver;

An antenna with periodical scanning of the azimuth;

A front-end representing the part of the receiver with highest frequency;

A block referenced as RX that represents the part of the receiver with lowest frequency;

An A/D, i.e. a sub-system for sampling the radar analogic signal that executes the digitalization of the components in phase and quadrature;

A processing of the signal that executes a digital filtering on a radar signal;

A block indicated as Detection i.e. a sub-system with threshold for the detection of the echoes starting from the radar signal filtered by the signal processing;

A data extractor, i.e. a sub-system for the aggregation of the "detections" into "plots" with range and azimuth estimation;

A block "Phase difference" that calculates the coherent phase difference between two subsequent sweeps of the radar signal filtered by the signal processing;

A block indicated as "Doppler velocity", i.e. a sub-system that, starting from the plot and the information of the phase difference, associates to the same plot an estimation of the absolute Doppler speed;

A scan-to-scan correlator that, starting from the plots of two or more subsequent scans and the absolute Doppler speed associated to them, executes the filtering of the sea spikes;

a Display that finally visualize the plots that overcame the filtering of the scan-to-scan correlator.

The present disclosure concerns the blocks "Phase difference", "Doppler velocity" and "Scan-to-scan correlation".

The method described by the present disclosure overcomes the limitations of use of the standard plots correlation window (utilized in [3]), that is not based on the estimation of the radial speed of the plots, but on the maximum absolute speed that a target can achieve, that is fixed "a priori". The use of the standard correlation windows does not solve the problem of the large number of false alarms generated by the sea spikes in case of sea state force 3 or higher, since the windows is too large in range and the probability to have a plot due to a sea spike within the window is very high. The range amplitude of the correlation window utilized in the present disclosure depends instead by the accuracy of the estimation of the absolute radial speed and is much smaller than the standard one (FIG. 8), therefore the probability to have a plot due to a sea spike is much lower, though maintaining a high correlation probability in the presence of a target.

For further clarity, FIG. 8 shows graphically the difference in terms of amplitude between the correlation window obtained by the present disclosure and that obtained by the canonical method of [3]. In the figures, one indicates as:

$P_n$ and $P_{n-1}$, two plots generated by the radar extractor respectively at the n-th and (n−1)-th scan, the plot $P_n$ having range and azimuth co-ordinates ($R_n$, $A_n$) and Doppler speed equal to $v$;

$P_b$, the center of the correlation speed generated starting from plot $P_n$, whose azimuth $A_b$ is equal to $A_n$ while range $R_b$ is obtained by the following formula:

$$R_b = R_n - v \cdot T_{scan}$$

wherein $T_{scan}$ is the scanning time period of the antenna;

$LA_a$, the azimuth angular half-amplitude of the correlation window both in the canonical case and the present disclosure case, is equal to:

$$LA_a = a\sin\left(\frac{V_{max} \cdot T_{scan}}{R_n}\right)$$

wherein $V_{max}$ is the maximum value of the absolute speed that a target can achieve.

$LR_a$, the range half-width of the correlation window utilized in the present disclosure, is equal to:

$$LR_a = 3 \cdot \sqrt{\sigma_R^2 + \sigma_v^2 \cdot T_{scan}^2}$$

wherein $\sigma_R$ is the standard deviation of the range estimation error and $\sigma_v$ is the standard deviation of the radial speed estimation error by the radar.

$LR'_a$, the range half-width of the standard correlation speed, is equal to:

$$LR'_a = V_{max} \cdot T_{scan} + \epsilon$$

wherein $\epsilon$ is the range estimation maximum error by the radar; one assumes here that the maximum error be approximable to three times the error standard deviation.

The estimation of the radial speed $v$ by the radar is positive in case of moving away of the object that caused the radar echo and negative in case of coming closer to the same. In FIG. 8 one has assumed an echo coming closer.

By way of example, one compares the range width of the correlation window of the present disclosure with that utilized according to the standard method of [3]; the following values of the quantities determining such widths are considered:

scanning time $T_{scan}$ of the radar antenna equal to 6 seconds;

standard deviation of the range measurement range error $\sigma_R$ of the radar equal to 3 meters;

standard deviation $\sigma_v$ of the target speed estimation error obtained by applying the method of calculation of the absolute radial speed according to the present disclosure, equal to 0.3 m/s;

pre-set maximum speed for a naval target $V_{max}$ equal to 20 m/s.

One obtains in the standard case:

$$LR'_A = V_{max} \cdot T_{scan} + 3 \cdot \sigma_R = 20 \cdot 6 + 3 \cdot 3 = 129 \text{ m}$$

One obtains in the case of the method of the present disclosure:

$$LR_A = 3 \cdot \sqrt{\sigma_R^2 + \sigma_v^2 \cdot T_{scan}^2} = 3 \cdot \sqrt{9 + 0.09 \cdot 36} = 10.5 \text{ m}$$

Hence, one achieves the utilization of a correlation window having an area that is one order of magnitude smaller.

The present disclosure distinguishes itself from the prior art solutions based on the use of Doppler speed in the signal processing (for example [4] and [5]), owing to the fact that such an estimation is calculated and utilized after the radar extractor, which requires a computational load that is remarkably smaller. Another difference with respect to [4] and [5] concerns the use made of the Doppler speed estimation: it determines the correlation of the plots of subsequent antenna scans without intervening in the detection step.

The method of the present disclosure equally applies to any other spike caused by liquid bodies, for example river spikes or the like.

Aspects of the present disclosure have been above described and some modifications of the present disclosure have been suggested, but it should be understood that those skilled in the art can make variations and changes, without so departing from the related scope of protection, as defined by the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

LIST OF REFERENCES

1. J. P. Hansen and V. F. Cavaleri, "High-Resolution Radar Sea Scatter, Experimental Observations and Discriminants," NRL Report 8557, Mar. 5, 1982.
2. Merrill I. Skolnik, "Radar handbook", third edition—The McGraw-Hill Companies—2008.
3. U.S. Pat. No. 3,699,573 A, A. La Verne et al., "System for automatic initiation of target tracking in a track-while-scan radar", 17 Apr. 1972.
4. US 2010/026559 A1, A. Siegel, "System for enhanced detection of a target", 4 Feb. 2010.
5. U.S. Pat. No. 4,972,194 A, B. Carrara et al., "Method and device compensating for the speed of clutter in a coherent Doppler radar with variable blind speed", 20 Nov. 1990.

What is claimed is:

1. A method for filtering clutter caused by waterbodies, by way of scan-to-scan correlation of radar information, utilizing a radar covering a radar area in subsequent scans of duration $T_{scan}$ wherein the radar transmits a signal and listens to return echoes during a sweep time interval, the radar comprising i) a coherent transmitter and receiver with a coherent oscillator providing a phase reference, ii) a signal processor, and iii) a radar extractor that on the basis of detected echoes produced either by objects close to a waterbody surface or by the waterbody surface itself, extracts plots characterized by range and azimuth, the method separating plots relating to objects from the plots relating to waterbody by performing the following steps:
   A estimating a radial speed of the plots, and
   B scan-to-scan correlating the plots;
wherein step A comprises i) quantization of the radar area into a plurality of elementary radar cells having dimensions comparable to a range radar resolution, and ii) execution of the following sub-steps:
   A1 extracting from the radar signal provided by the coherent receiver a phase of all echoes within a single sweep,
   A2 for each radar cell, calculating phase differences $\Delta\phi$ between any two subsequent sweeps within a predefined coherent processing interval comprising a multiplicity of subsequent sweeps;
   A3 for the radar cells wherein the radar extractor has extracted a plot, calculating instantaneous absolute radial speeds v and radial direction of the echoes, starting from the phase differences of sub-step A2, as $v=(\lambda/4\pi T)\cdot\Delta\phi$, wherein the radial direction of the echoes is positive in case of moving away of an object that has caused the echo from the radar and negative in the case of approaching to the radar, $\lambda$ is a radar operation wavelength, T is a time interval between two subsequent steps;
   A4 averaging the values of the absolute radial speeds and directions of the echoes obtained in sub-step A3, obtaining the radial speeds and radial directions of the corresponding extracted plots;
wherein step B comprises the following sub-steps executed by the radar extractor for each extracted plot, using a memory area:
   B1 storing the plot with range R and azimuth A in said memory area at each radar scan;
   B2 defining a range-azimuth area, having:
      half angular azimuth width $LA_a = \text{asin}(V_{max} T_{scan}/R)$, wherein $V_{max}$ is a pre-defined maximum absolute speed for the target at the range R of the plot;
      half range width $LR_a \cong 3 \cdot \sqrt{\sigma_R^2 + \sigma_v^2 \cdot T_{scan}^2}$, wherein $\sigma_R^2$ is a variance of a range estimation error and $\sigma_v^2$ is a variance of the Doppler speed estimation error;
      range center position $R_b = R - v^* T_{scan}$, using said absolute radial speeds v of the plot calculated in step A4;
      azimuth center position $A_b = A$;
   B3 correlating by position the plot of the current radar scan with all plots stored in said memory area during a previous scan, in order to verify whether at least one of the stored plots falls within said range-azimuth area;
   B4 if the correlation value obtained in step B3 is below a pre-defined threshold, so that the whole plot falls outside said range-azimuth area, eliminating the plot from said memory area;
wherein the remaining plots in said memory area are being put at disposal of the radar for a further analysis and visualization on a radar display.

2. The method according to claim 1, wherein the scan-to-scan correlation of step B3 is further performed with respect to plot speeds.

3. The method according to claim 1, wherein the radar is a radar with a solid-state radar transmitter for a monitoring of waterbodies and Vessel Traffic Service applications.

4. The method according to claim 1, wherein a calculation of the instantaneous absolute radial speeds and radial directions is performed for each radar cell or for those radar cells that have generated detection in the signal processor, or have generated a plot in the radar extractor.

5. The method according to claim 1, wherein the correlation of step B3 is performed with respect to plots of $k \geq 2$ previous scans where k is a positive integer.

6. The method according to any claim 1, wherein said elementary radar cells have dimensions comprised between 0.5 times and 2 times a radar range resolution.

7. A coherent radar comprising:
- a coherent transmitter and a coherent receiver,
- a signal processor,
- a radar extractor that extracts plots characterized by range and azimuth, and
- electronic processing means configured to execute the steps of the clutter filtering according to claim 1.

8. The coherent radar according to claim 7, further comprising a console that includes a display for a visualization of radar detections, wherein a signal filtered by said electronic processing means is visualized.

9. The coherent radar according to claim 7, wherein said electronic processing means are constituted by the signal processor.

10. The coherent radar of claim 7, said coherent radar being for detection of objects on waterbodies, covering a radar area in subsequent scans by transmitting a signal and listening to return echoes during a sweep time interval.

* * * * *